United States Patent [19]

Liou

[11] Patent Number: 5,291,627
[45] Date of Patent: Mar. 8, 1994

[54] WINDSHIELD WIPER ARM ASSEMBLY WITH FLUID PASSAGE THERETHOUGH

[76] Inventor: Ming-Chong Liou, No. 17, Lane 93, Niou-Pu South Road, Hsinchu, Taiwan

[21] Appl. No.: 43,541

[22] Filed: Apr. 6, 1993

[51] Int. Cl.⁵ .......................... B60S 1/52; B60S 1/48; B60S 1/34
[52] U.S. Cl. .............. 15/250.04; 15/250.35; 15/250.32; 239/284.1
[58] Field of Search ........... 15/250.04, 250.03, 250.02, 15/250.01, 250.32, 250.35; 239/284.1, 284.2

[56] References Cited

U.S. PATENT DOCUMENTS

| | | | |
|---|---|---|---|
| 2,168,202 | 8/1939 | Grantham | 15/250.04 |
| 3,234,579 | 2/1966 | Roscoe | 15/250.04 |
| 3,422,484 | 1/1969 | Carpenter | 15/250.04 |
| 3,427,675 | 2/1969 | Tibbet | 15/250.04 |
| 4,060,872 | 12/1977 | Bucklitzsch | 15/250.04 |
| 4,296,521 | 10/1981 | Mower | 15/250.32 |
| 5,016,312 | 5/1991 | Frimley | 15/250.04 |

FOREIGN PATENT DOCUMENTS

| | | | |
|---|---|---|---|
| 2340482 | 3/1975 | Fed. Rep. of Germany | 15/250.04 |
| 2912631 | 10/1980 | Fed. Rep. of Germany | 15/250.04 |
| 3323004 | 1/1985 | Fed. Rep. of Germany | 15/250.04 |
| 3907980 | 9/1990 | Fed. Rep. of Germany | 15/250.04 |

Primary Examiner—Harvey C. Hornsby
Assistant Examiner—Gary K. Graham
Attorney, Agent, or Firm—Morton J. Rosenberg; David I. Klein

[57] ABSTRACT

A construction improvement for car-used windshield washers, in which the connecting rod of a windshield wiper arm is inserted into a tube at its front end and has a passage formed therein as well as a plurality of water holes disposed on its rear end. The connecting rod is held on the connecting portion of a block so that water can flow through the passage provided inside the rod and sprinkle over the windshield from the water holes along with the rocking motion of a windshield wiper arm, obtaining an effective cleaning for the dust on the windshield.

1 Claim, 5 Drawing Sheets

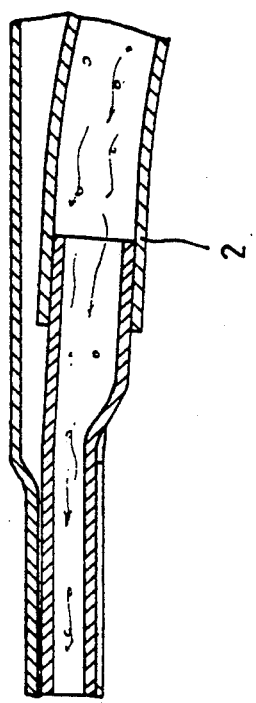
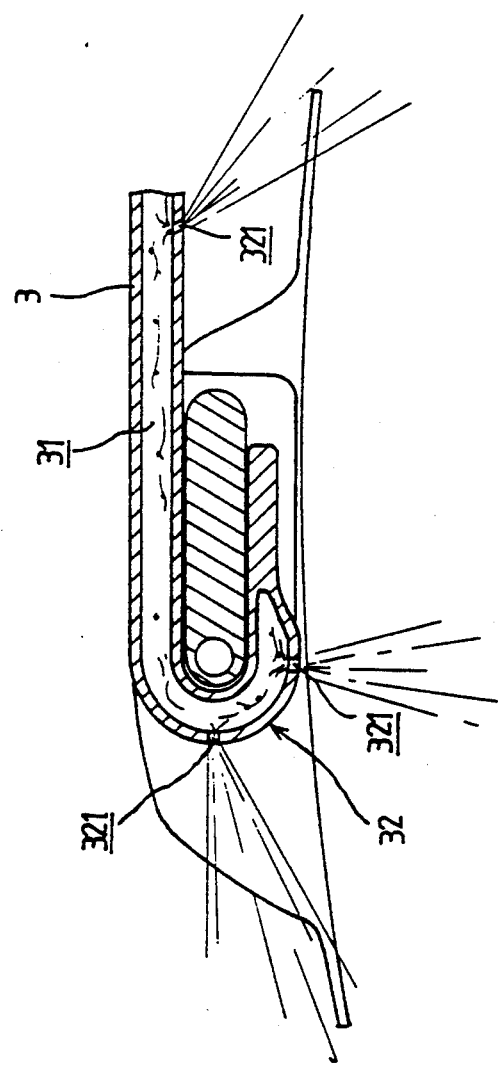
FIG. 2B
FIG. 2A

WINDSHIELD WIPER ARM ASSEMBLY WITH FLUID PASSAGE THERETHOUGH

FIELD OF THE INVENTION

The invention relates to a construction improvement of car-used windshield washers, especially to a connecting rod of a windshield wiper that has a plurality of water holes disposed on its rear hooked end and is inserted into a tube at its front end. In cooperation with the passage provided inside the connecting rod, the water flowing through the tube sprays over the windshield from the water holes along with the rocking motion of the windshield wiper arm in order to obtain an effective cleaning for the dust on windshields.

DESCRIPTION OF THE PRIOR ART

A prior art car-used windshield wiper sprays water over the windshield from the water holes before it begins to scour dust and then the wiper moves to and fro to remove dust from the windshield. Water ejected from such an arrangement can only reach a limited area so that some corner zones are left uncleaned. There is also another type of windshield wipers that has a water chamber on the sides of which are disposed some water holes. Such a construction generally has a shortcoming of assemblage troublesomeness other than fabrication laboriousness, which in turn raises costs.

OBJECT OF THE INVENTION

The invention has been developed in consideration of the above problems, and its object is to provide an improved construction for car-used windshield wiper washers, facilitating the assemblage and fabrication as well as effectively dispersing water over windshields for completely cleaning dust.

BRIEF DESCRIPTION OF THE DRAWINGS

The above objects and other features of the invention will become apparent by reference to the following description taken in conjunction with the accompanying drawings in which:

FIGS. 2A and 2B are enlarged partial sectional views of the invention;

DETAILED DESCRIPTION

Figure 1:
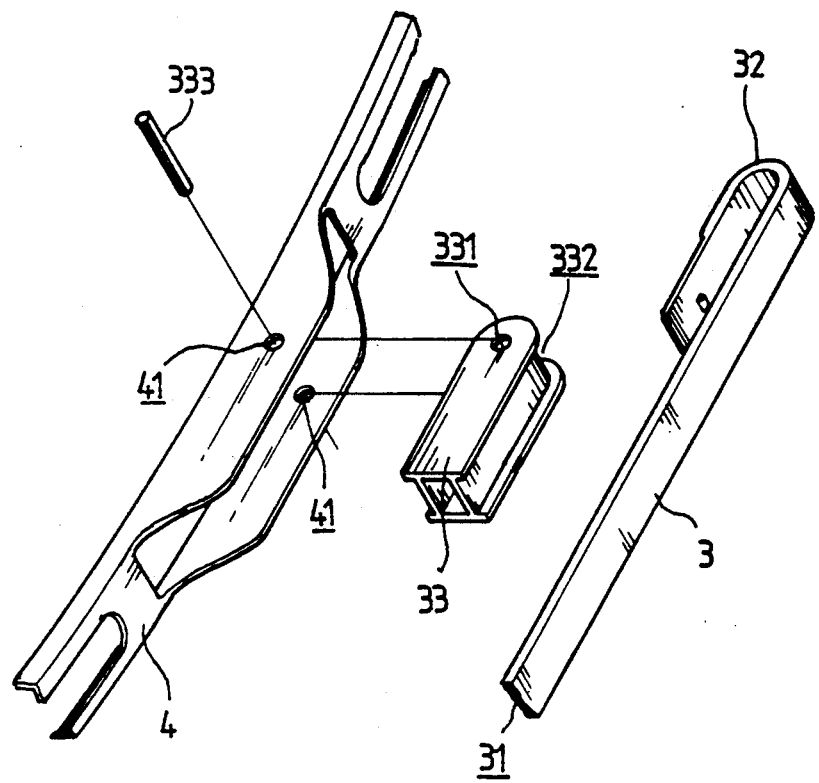
FIG. 1 is a perspective exploded view of a subassembly of this invention.
Figure 2:
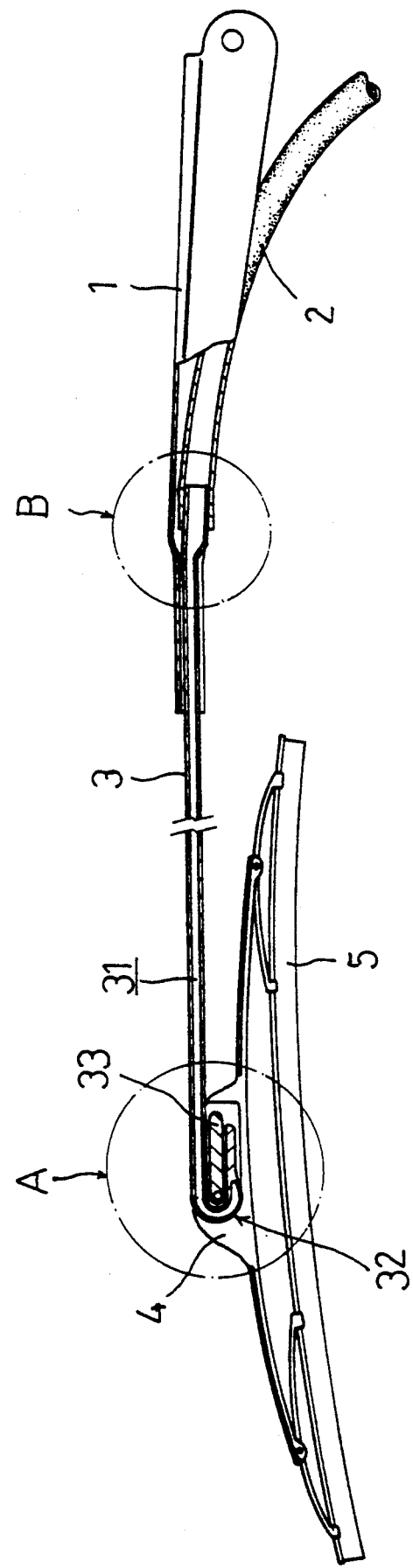
FIG. 2 is a schematic view of the invention.
Figure 3:
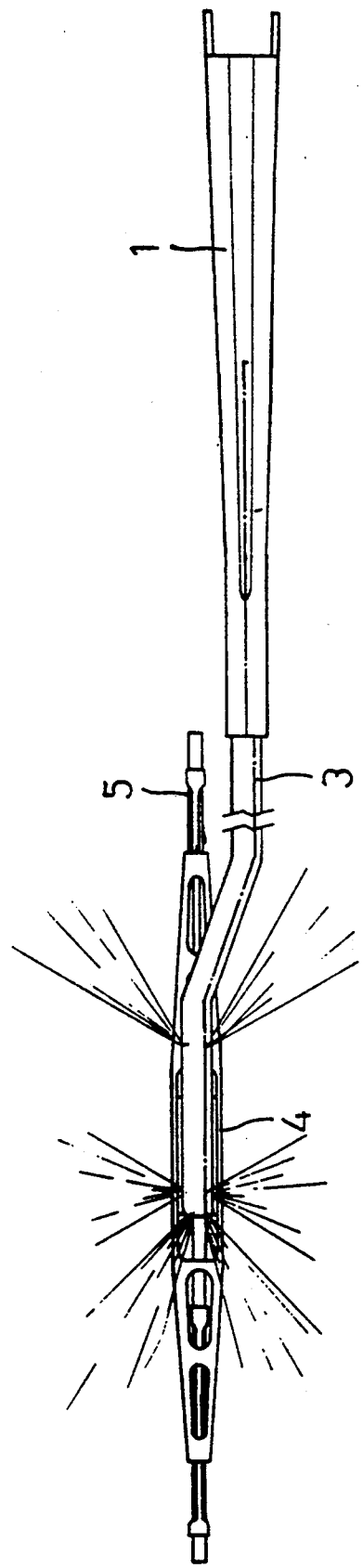
FIG. 3 is a plan view of the invention.

First referring to FIGS. 1, 2, and 3; The invention mainly comprises a connecting rod (3) having a passage (31) provided therein with a tube (2) connected at its one end and enveloped in a wiper arm (1), the hooked end (32) of which connecting rod (3) has a plurality of water holes (321) disposed thereon and is inserted into a block (33) having a through hole (331) on its front end and a groove (332) formed on its outside surfaces and containing the connecting rod (3). A plug pin (333) passing through the holes (41) on two sides of a connecting member (4) and the through hole (331) of the block (33) further secures the hooked end (32) of the connecting rod (3) and the block (33) in the channel situated in the middle segment of the connecting member (4). Flowing through the tube (2) and the passage (31) of the connecting rod (3), water is ejected through the water holes (321) from the hooked end (321).

Figure 4:
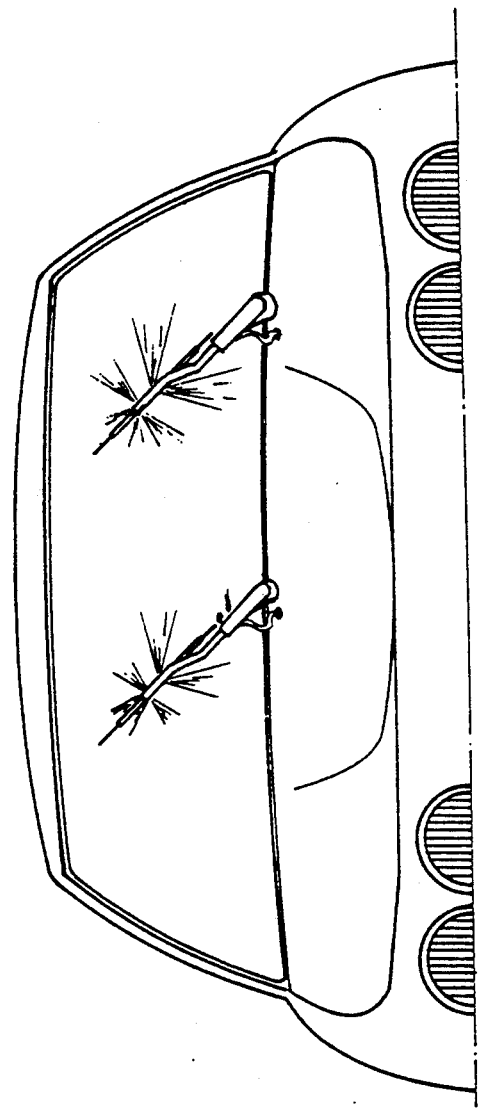
FIG. 4 is a perspective view showing an example of windshield wipers working on a car.

With reference to FIGS. 2, 3, and 4; as is mounted on windshields, the wiper arm (1) rocks regularly and urges the connecting rod (3) to move so that fluid passing through the passage (31) of the connecting rod (3) and the water holes (321) located on the hooked end (32) is sprayed on the windshield along with the rocking motion of the connecting rod (3), providing plenty of water for the wiper blade to remove dust in the most effective way.

As described above, the invention is indeed a practical and useful construction for windshield washers, which construction combines an assemblage of simple structures and obviously has unique originality as well as significant advantages in its effectiveness over conventional apparatuses. And so we pray that a patent may be granted.

What is claimed is:

1. A windshield wiper assembly for use in an automobile, comprising:

(a) a hollow elongated tubular rod forming a fluid flow passage therein along its length, said hollow elongated tubular rod having a first end connected to a fluid supply line, and a substantially U-shaped second end, said fluid flow passage extending from said first end, in fluid communication with said line, to said second end and having at said second end a U-shape as defined by the rod, said passage passing therethrough a fluid from said fluid supply line to said substantially U-shaped second end;

(b) an elongated block member having a transversely directed opening formed therethrough and a groove adapted to contiguously receive said substantially U-shaped second end of said elongated tubular rod;

(c) a plurality of outlet ports formed through a wall of said substantially U-shaped second end in fluid communication with said fluid flow passage therein for directing said fluid onto a windshield of an automobile; and, (d) a connecting member adapted to pivotally receive said block member, said connecting member having a pair of substantially parallel spaced apart flanges having at least one pair of linearly aligned openings formed therein, such that said block member is received between said flanges and pivotally secured to said connecting member by a pin which extends through said linearly aligned at least one pair of openings in said flanges and said transverse opening in said block member.

* * * * *